(12) United States Patent
Okugawa et al.

(10) Patent No.: US 7,076,944 B2
(45) Date of Patent: Jul. 18, 2006

(54) EXHAUST GAS CLEANING SYSTEM OF INTERNAL COMBUSTION ENGINE

(75) Inventors: Shinichiro Okugawa, Toyota (JP); Tsukasa Kuboshima, Okazaki (JP)

(73) Assignee: Denso Corporation, Kariya (JP)

( * ) Notice: Subject to any disclaimer, the term of this patent is extended or adjusted under 35 U.S.C. 154(b) by 33 days.

(21) Appl. No.: 10/810,750

(22) Filed: Mar. 29, 2004

(65) Prior Publication Data
US 2004/0187477 A1 Sep. 30, 2004

(30) Foreign Application Priority Data
Mar. 31, 2003 (JP) ............................. 2003-094851

(51) Int. Cl.
*F01N 3/00* (2006.01)
(52) U.S. Cl. .................... 60/295; 60/278; 60/297; 60/311
(58) Field of Classification Search ............... 60/285, 60/286, 278, 295, 297, 311, 274
See application file for complete search history.

(56) References Cited

U.S. PATENT DOCUMENTS

| | | | | |
|---|---|---|---|---|
| 5,701,735 A | * | 12/1997 | Kawaguchi | .............. 60/274 |
| 5,716,586 A | * | 2/1998 | Taniguchi | .............. 422/173 |
| 6,786,041 B1 | * | 9/2004 | Itoh et al. | .............. 60/274 |
| 6,820,418 B1 | * | 11/2004 | Nakatani et al. | .............. 60/297 |
| 6,851,258 B1 | * | 2/2005 | Kawashima et al. | .............. 60/311 |

FOREIGN PATENT DOCUMENTS

| | | |
|---|---|---|
| DE | 199 52 830 A1 | 5/2001 |
| DE | 100 33 159 A1 | 1/2002 |
| EP | 1234959 A2 | 8/2002 |
| EP | 1291513 A2 | 3/2003 |
| JP | 11-101122 | 4/1999 |

* cited by examiner

*Primary Examiner*—Binh Q. Tran
(74) *Attorney, Agent, or Firm*—Nixon & Vanderhye P.C.

(57) ABSTRACT

An exhaust gas cleaning system of a diesel engine includes a diesel particulate filter (a DPF) disposed in an exhaust passage, and a diesel oxidation catalyst (a DOC) disposed upstream of the DPF. When an electronic control unit (an ECU) performs a temperature increasing operation such as post-injection to eliminate particulate matters accumulated in the DPF, a ratio (a duty ratio) between a performing period and an interrupting period of the temperature increasing operation is changed in accordance with temperature of the DPF. Thus, a quantity of hydrocarbon supplied to the DOC is controlled stepwise or continuously. Thus, the temperature of the DPF can be increased to target temperature quickly and can be maintained near the target temperature when the regeneration of the DPF is performed.

16 Claims, 9 Drawing Sheets

EXHAUST GAS CLEANING SYSTEM OF INTERNAL COMBUSTION ENGINE

CROSS REFERENCE TO RELATED APPLICATION

This application is based on and incorporates herein by reference Japanese Patent Application No. 2003-94851 filed on Mar. 31, 2003.

BACKGROUND OF THE INVENTION

1. Field of the Invention

The present invention relates to an exhaust gas cleaning system of an internal combustion engine having a particulate filter in an exhaust passage. Specifically, the present invention relates to an exhaust gas cleaning system capable of performing temperature increase regeneration of a particulate filter.

2. Description of Related Art

In recent years, an exhaust gas cleaning system, which reduces discharge of toxic components by treating exhaust gas discharged from an internal combustion engine with a catalyst or a filter, has gained importance as a measure to conserve the environment. For instance, an exhaust gas cleaning system having a diesel particulate filter (DPF) disposed in an exhaust pipe for collecting particulate matters discharged from the diesel engine is known. The DPF is regenerated by combusting and eliminating the accumulated particulate matters regularly. Thus, the DPF can be used continuously.

The regeneration of the DPF is performed by increasing the temperature of the DPF to certain temperature (for instance, 600° C. or above), at which the particulate matters can be combusted, when the quantity of the accumulated particulate matters (a particulate matter accumulation quantity PM, hereafter) reaches a predetermined value. The particulate matter accumulation quantity PM is calculated based on a pressure difference across the DPF. At that time, temperature increasing means performs post-injection, retardation of fuel injection timing, restriction of intake air or the like. However, such temperature increasing methods deteriorate fuel consumption.

As the temperature T of the DPF for performing the regeneration is increased, combustion velocity of the particulate matters is increased and the regeneration is finished in a short time length. As a result, the deterioration in the fuel consumption accompanying the regeneration of the DPF can be reduced. However, if the DPF temperature T is too high, there is a possibility of damage to the DPF, degradation of an oxidation catalyst supported by the DPF or the like as shown in FIG. 13. In FIG. 13, a solid line "v" represents the combustion velocity of the accumulated particulate matters, another solid line "f" is the degree of the deterioration in the fuel consumption and an area H is a temperature area where there is a possibility of the degradation of the oxidation catalyst or the damage to the DPF. Therefore, in order to inhibit the deterioration in the fuel consumption and to perform the regeneration of the DPF safely, the DPF temperature T has to be maintained near predetermined temperature. Therefore, usually, temperature of the exhaust gas upstream or downstream of the DPF is sensed and the temperature increasing means is operated so that the sensed temperature coincides with the target temperature.

In a technology disclosed in Japanese Patent Application Unexamined Publication No. H11-101122, an oxidation catalyst (a diesel oxidation catalyst: a DOC, hereafter) is disposed upstream of the DPF in series as shown in FIG. 14A, and the temperature of the exhaust gas upstream of the DPF and downstream of the DOC is sensed as the DPF temperature T. Then, as shown in FIG. 15, if the DPF temperature T exceeds a predetermined value (for instance, 500° C.), the temperature increasing operation by the temperature increasing means is stopped (as shown by a state "OFF" in a solid line "T-UP" in FIG. 15). If the DPF temperature T becomes lower than the predetermined temperature (for instance, 500° C.), the temperature increasing operation is performed by the temperature increasing means (as shown by a state "ON" in the solid line T-UP in FIG. 15). In FIG. 15, an area L represents a temperature area where the accumulated particulate matters cannot be combusted.

However, the above technology only performs the operation for switching the temperature increasing means, which performs the post-injection, for instance, between an operated state and a stopped state. Therefore, if the post-injection is stopped (OFF) at a time point $t_A$ in FIG. 16 when the temperature of the exhaust gas shown by a thin line "b" in FIG. 16 approaches the predetermined target temperature Tt during the operation for switching between performance and interruption of the post-injection, the temperature of the DOC decreases rapidly as shown by a broken line "a" in FIG. 16. It is because low-temperature exhaust gas enters the DOC and generation of reaction heat of hydrocarbon stops. The change of the sensed temperature of the exhaust gas upstream of the DPF shown by the thin line "b" in FIG. 16 is delayed with respect to the change in the DOC temperature shown by the broken line "a". Therefore, at this time point, the sensed temperature shown by the thin line "b" is maintained at high temperature for a while. A graph shown in FIG. 14B shows temperature distribution in the exhaust pipe shown in FIG. 14A at that time, based on temperatures sensed at points P1–P7 shown in FIG. 14A.

More specifically, the post-injection is interrupted (OFF) while the DPF upstream exhaust gas temperature shown by the thin line "b" is maintained at the high temperature. The post-injection is restarted when the DPF upstream exhaust gas temperature shown by the thin line "b" becomes lower than the target temperature (for instance, 500° C.) Tt at a time point $t_B$ in FIG. 16. The DOC temperature has been decreased largely as shown by the broken line "a" in FIG. 16 by the time when the post-injection is restarted at the time point $t_B$. Therefore, the low-temperature exhaust gas passing through the low-temperature DOC enters the DPF. As a result, the DPF temperature downstream of the DOC decreases largely once as shown by a heavy line "c" in FIG. 16 in spite of the fact that the post-injection is performed.

Therefore, it takes a long time before the DOC temperature is increased by the hydrocarbon reaction heat generated through the restart of the post-injection as shown by the broken line "a", and subsequently the temperature of the DPF downstream of the DOC recovers to the proximity of the target temperature Tt as shown by the heavy line "c". When the post-injection is performed but the DPF temperature is low (for instance, 450° C. or lower), the combustion velocity of the particulate matters on the DPF is low. In the state, the fuel consumption is deteriorated because of the post-injection, but little or no particulate matters on the DPF can be combusted.

SUMMARY OF THE INVENTION

It is therefore an object of the present invention to provide an exhaust gas cleaning system capable of suitably determining an amount of energy inputted to regenerate a particulate filter in accordance with temperature of the particulate filter. Thus, the temperature of the particulate filter can be increased quickly to target temperature and can be maintained near the target temperature during the regeneration of the particulate filter. As a result, deterioration in fuel consumption, which is caused when accumulated particulate matters cannot be combusted, can be prevented. Moreover, the regeneration of the particulate filter can be performed efficiently while preventing damage to the particulate filter or degradation of an oxidation catalyst.

According to an aspect of the present invention, an exhaust gas cleaning system of an internal combustion engine has a particulate filter, temperature increasing means, temperature estimating means, particulate matter accumulation quantity estimating means and regenerating means. The particulate filter is disposed in an exhaust passage of the internal combustion engine. The temperature increasing means increases temperature of the particulate filter. The temperature estimating means estimates the temperature of the particulate filter. The particulate matter accumulation quantity estimating means estimates a quantity of particulate matters accumulated in the particulate filter. The regenerating means regenerates the particulate filter by controlling the temperature increasing means to increase the temperature of the particulate filter to predetermined temperature and by eliminating the accumulated particulate matters through combustion when the quantity of the accumulated particulate matters estimated by the particulate matter accumulation quantity estimating means exceeds a predetermined value. The regenerating means includes energy input amount determining means for determining an amount of energy inputted by the temperature increasing means in accordance with the temperature of the particulate filter estimated by the temperature estimating means.

In the above structure, the regenerating means sets the energy input amount, which is inputted by the temperature increasing means, to an optimum value in accordance with the temperature of the particulate filter and changes the energy input amount in accordance with the change in the temperature of the particulate filter. Thus, the temperature of the particulate filter is quickly increased to the target temperature and is maintained near the target temperature. Therefore, deterioration in fuel consumption, damage to the particulate filter, or degradation of an oxidation catalyst can be prevented. Thus, the regeneration of the particulate filter can be performed efficiently.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF THE REFERRED EMBODIMENTS

First Embodiment

Figure 1:
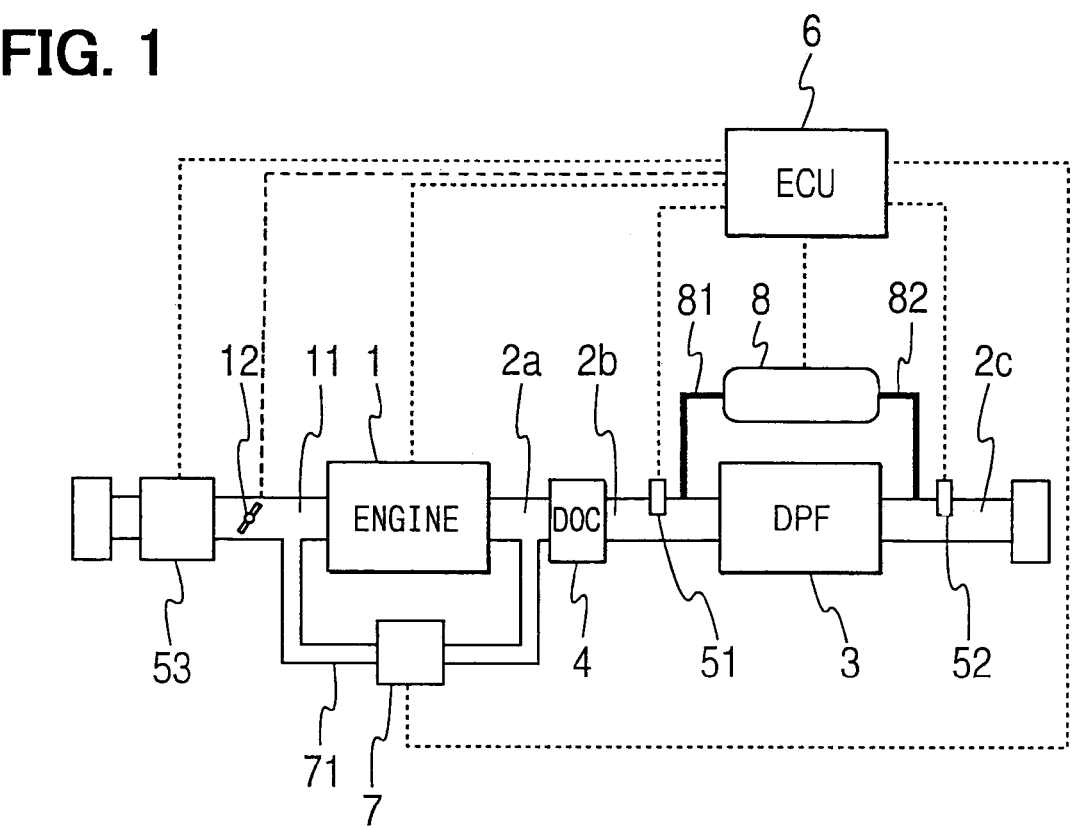
FIG. 1 is a schematic diagram showing an exhaust gas cleaning system according to a first embodiment of the present invention.

Referring to FIG. 1, an exhaust gas cleaning system of a diesel engine 1 according to a first embodiment of the present invention is illustrated. As shown in FIG. 1, a diesel particulate filter (a DPF) 3 is disposed between exhaust pipes 2b, 2c, which form an exhaust passage 2 of the diesel engine 1. An oxidation catalyst (a diesel oxidation catalyst: a DOC) 4 is disposed upstream of the DPF 3, between exhaust pipes 2a, 2b. The DPF 3 is a ceramic filter having publicly known structure. For instance, the DPF 3 is formed of heat-resistant ceramic such as cordierite in the shape of honeycomb structure having a multiplicity of cells as gas passages provided by separation walls. An inlet or an outlet of each cell is blocked alternately. The exhaust gas discharged from the engine 1 flows downstream while passing through the porous separation walls of the DPF 3. At that time, particulate matters are collected and accumulated in the DPF 3 gradually.

The DOC 4 has publicly known structure, in which a ceramic supporting member formed of a cordierite honeycomb structural body and the like supports an oxidation catalyst on its surface. The DOC 4 combusts hydrocarbon (HC) supplied into the exhaust passage 2 through catalytic reaction and increases the temperature of the exhaust gas. Thus, the DOC 4 increases the temperature of the DPF 3. The oxidation catalyst may be supported on the DPF 3 or may not be supported on the DPF 3. In the present embodiment, the DPF 3 supporting no oxidation catalyst is employed. Alternatively, system structure, which includes the DPF 3 supporting the oxidation catalyst but does not include the DOC 4, may be employed.

An exhaust gas temperature sensor 51 is disposed in the exhaust pipe 2b upstream of the DPF 3 and another exhaust gas temperature sensor 52 is disposed in the exhaust pipe 2c downstream of the DPF 3. The exhaust gas temperature sensors 51, 52 are connected to the ECU 6 to sense the temperatures of the inlet gas and the outlet gas of the DPF 3 and to output the temperatures to the ECU 6 respectively. The ECU 6 estimates the temperature (the central temperature) of the DPF 3 based on the outputs of the exhaust gas temperature sensors 51, 52. An air flow meter (an intake flow rate sensor) 53 is disposed in an intake pipe 11 of the engine 1 for outputting the intake air flow rate to the ECU 6. An intake throttle valve 12 is disposed in the intake pipe 11 downstream of the air flow meter 53 for increasing or decreasing the intake air flow rate responsive to a command of the ECU 6. The intake pipe 11 of the engine 1 communicates with the exhaust pipe 2a upstream of the DOC 4 through an EGR pipe 71 having an EGR valve 7. The EGR valve 7 increases or decreases an exhaust gas recirculation quantity (an EGR quantity) of the exhaust gas recirculated to the intake air responsive to the command of the ECU 6.

The exhaust gas temperature sensors 51, 52 for sensing the temperatures of the exhaust gas upstream and downstream of the DPF 3 are disposed upstream and downstream of the DPF 3 respectively. Alternatively, only one exhaust gas temperature sensor may be provided upstream or downstream of the DPF 3 and the temperature of the DPF 3 may be estimated from the output of the exhaust gas temperature sensor.

A pressure difference sensor 8 for sensing a pressure difference across the DPF 3 is connected to the exhaust pipes 2b, 2c in order to estimate a quantity of the particulate matters collected and accumulated in the DPF 3 (a particulate matter accumulation quantity PM). One end of the pressure difference sensor 8 is connected to the exhaust pipe 2b upstream of the DPF 3 through a pressure introduction pipe 81, and the other end of the pressure difference sensor 8 is connected to the exhaust pipe 2c downstream of the DPF 3 through another pressure introduction pipe 82. Thus, the pressure difference sensor 8 outputs a signal corresponding to the pressure difference across the DPF 3 to the ECU 6.

Moreover, the ECU 6 is connected with various sensors such as an accelerator position sensor or an engine rotation speed sensor. The ECU 6 detects an operating state of the engine 1 based on the detection signals outputted from the various sensors. The ECU 6 calculates an optimum fuel injection quantity, optimum injection timing, an optimum injection pressure and the like in accordance with the operating state and controls the fuel injection to the engine 1. The ECU 6 controls the intake air flow rate by regulating a valve opening degree of the intake throttle valve 12 and controls the EGR quantity by regulating a valve opening degree of the EGR valve 7.

Next, regeneration control of the DPF 3 performed by the ECU 6 will be explained. The ECU 6 includes temperature increasing means for increasing the temperature of the DPF 3 by increasing the quantity of the hydrocarbon included in the exhaust gas and by using the reaction heat of the hydrocarbon generated at the DOC 4. The ECU 6 includes particulate matter accumulation quantity estimating means for estimating the particulate matter accumulation quantity PM of the DPF 3. The ECU 6 includes regenerating means for operating the temperature increasing means to increase the temperature of the DPF 3 to predetermined temperature when the particulate matter accumulation quantity PM exceeds a predetermined value α. Thus, the accumulated particulate matters are eliminated through the combustion and the DPF 3 is regenerated. The ECU 6 includes temperature estimating means for estimating the temperature of the DPF 3 (the DPF temperature T) based on the outputs of the exhaust gas temperature sensors 51, 52.

Figure 2:
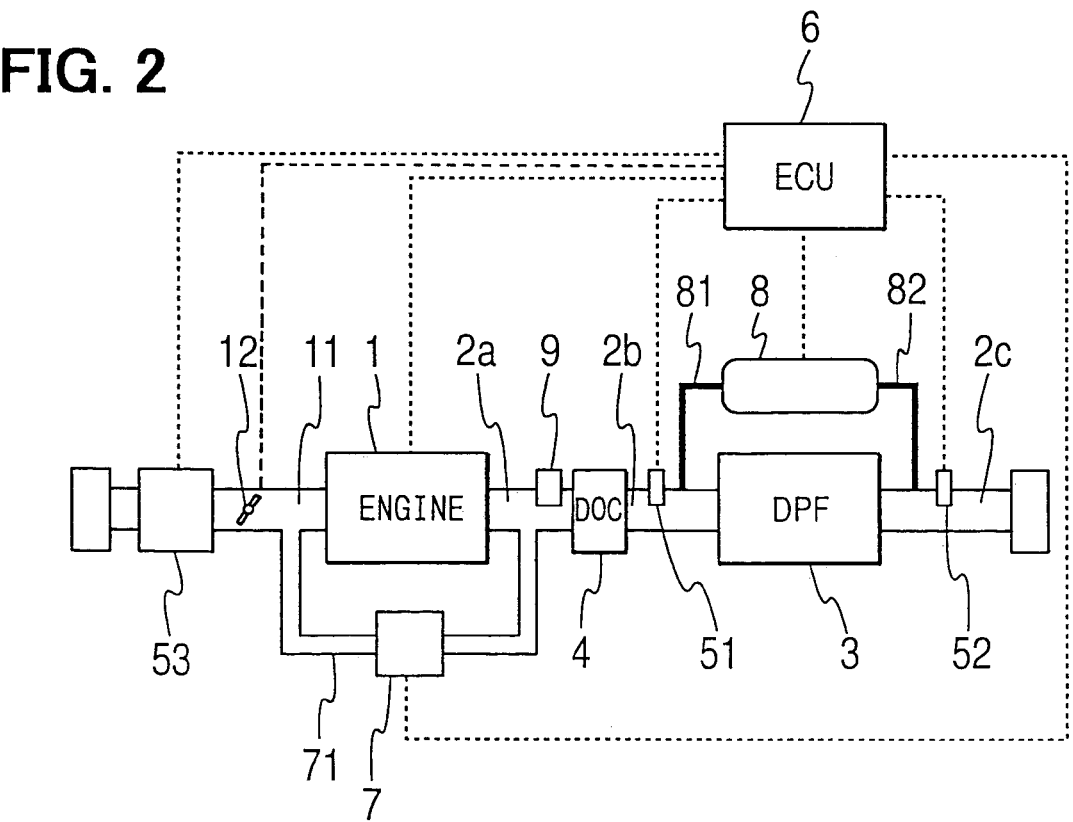
FIG. 2 is a schematic diagram showing another type of the exhaust gas cleaning system according to the first embodiment.

The temperature increasing means performs post-injection, retardation of the fuel injection timing, restriction of the intake air, an increasing operation of the EGR quantity and the like. Through such operations, the quantity of the unburned hydrocarbon supplied to the exhaust passage 2 is increased. The temperature of the exhaust gas is increased through the retardation of the fuel injection timing, the increasing operation of the EGR quantity and the like. As shown in an example of another system structure shown in FIG. 2, the hydrocarbon can be directly supplied from a fuel adding device 9 disposed in the exhaust pipe 2a upstream of the DOC 4. The temperature increasing means may perform one of the above operations or any combination of the above operations.

Figure 3:
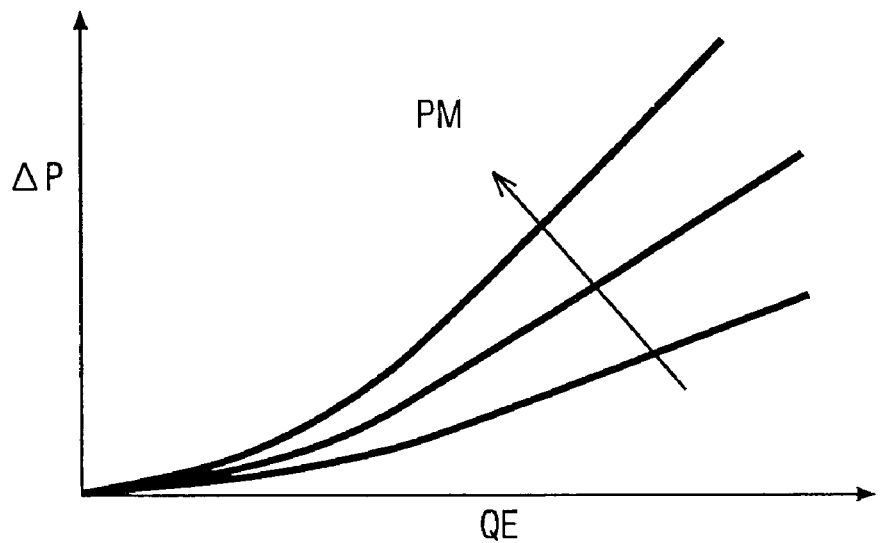
FIG. 3 is a graph showing a relationship between a pressure difference across a DPF and a particulate matter accumulation quantity with respect to an exhaust gas flow rate according to the first embodiment.

The particulate matter accumulation quantity estimating means estimates the particulate matter accumulation quantity PM from the pressure difference ΔP across the DPF 3 sensed by the pressure difference sensor 8, for instance. As shown in FIG. 3, if the flow rate QE of the exhaust gas is the same, the pressure difference ΔP across the DPF 3 increases as the particulate matter accumulation quantity PM increases. The particulate matter accumulation quantity PM increases along an arrow mark in FIG. 3. Therefore, the particulate matter accumulation quantity PM can be calculated by obtaining the relationship in advance. Alternatively, the particulate matter accumulation quantity PM may be estimated based on the operating state of the engine 1 detected through the outputs of the various sensors. Alternatively, the above estimating methods may be combined with each other. In the present embodiment, the temperature estimating means estimates the DPF temperature T based on the outputs of the exhaust gas temperature sensors 51, 52. Alternatively, only one exhaust gas temperature sensor may be disposed upstream or downstream of the DPF 3 and the temperature estimating means may estimate the DPF temperature T from the temperature of the exhaust gas upstream or downstream of the DPF 3.

The temperatures of the DOC 4 and the DPF 3 are determined by a balance between the heat generation through the oxidation reaction of the hydrocarbon and the heat diffusion to the exhaust gas or the surrounding area. The regenerating means of the related art can only perform the two-step operation for switching the temperature increasing means between the operated state and the stopped state. Therefore, if the output of the exhaust gas temperature sensor exceeds the predetermined value, the temperature increasing means is stopped. However, if the heat generation through the oxidation reaction of the hydrocarbon is eliminated abruptly, the heat diffusion to the exhaust gas or the surrounding area rapidly becomes relatively large. Specifically, if the supply of the hydrocarbon is stopped, the temperature quickly decreases at an upstream end portion of the DOC 4. However, there is a delay before the temperature decrease reaches a downstream end portion of the DOC 4 and the temperature decrease is reflected in the temperature of the downstream exhaust gas and in the output of the exhaust gas temperature sensor. Therefore, the temperature of the DOC 4 further decreases before the regenerating means restarts the temperature increasing means. Therefore, the temperature increase of the DPF 3 takes a long time, and no or little particulate matters can be combusted while the temperature of the DPF 3 is increasing. As a result, the regeneration takes a long time and the fuel consumption is deteriorated.

Therefore, in the present embodiment, the heat generation through the oxidation reaction of the hydrocarbon is decreased gradually if the exhaust gas temperature sensor output representing the DPF temperature T exceeds the predetermined value. As a result, the heat diffusion to the exhaust gas or the surrounding area becomes greater than the heat generation through the oxidation reaction of the hydrocarbon. Thus, the temperature of the DOC 4 or the DPF 3 decreases and the excessive temperature increase can be prevented. Moreover, the temperature of the DOC 4 can be decreased gradually, not rapidly.

Therefore, in the present embodiment, the regenerating means includes energy input amount determining means for determining an amount of energy inputted by the temperature increasing means in accordance with the DPF temperature T estimated by the temperature estimating means. More specifically, the energy input amount determining means includes duty ratio determining means for determining a period ratio (a duty ratio) between a performing period and an interrupting period of the temperature increasing operation performed by the temperature increasing means in accordance with the temperature of the DPF 3 and for changing the duty ratio in accordance with the change in the DPF temperature T for every predetermined cycles (10 seconds or less). In the related art, if the output of the exhaust gas temperature sensor, or temperature representing the DPF temperature T, exceeds the predetermined value even slightly, the temperature increasing operation such as the post-injection is interrupted at once. To the contrary, in the present embodiment, the frequency of performing the temperature increasing operation is decreased stepwise or continuously in accordance with the sensed temperature, unlike the two-step operation of the related art. Therefore, the rapid temperature decrease in the DOC 4 can be prevented. As a result, the DPF temperature T can be easily maintained near the target temperature Tt. Therefore, the DPF temperature does not decrease largely when the exhaust gas temperature sensor output becomes lower than the predetermined value and the temperature increasing operation such as the post-injection is restarted, so a suitable regenerating state can be maintained.

Figure 4:
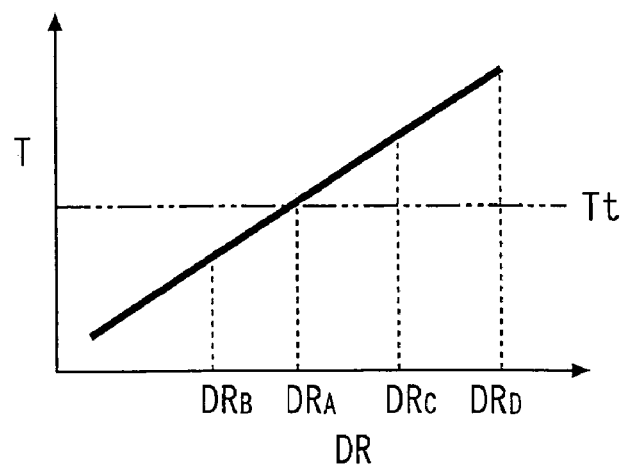
FIG. 4 is a graph showing a relationship between a duty ratio of a temperature increasing operation and DPF temperature according to the first embodiment.

More specifically, as shown in FIG. 4, the DPF temperature T increases as the duty ratio DR is increased. Therefore, in the case where the duty ratio DR required to maintain the DPF temperature T at the target temperature Tt is a ratio $DR_A$ (for instance, 60%), the duty ratio DR is decreased from the ratio $DR_A$ to another ratio $DR_B$ (for instance, 55%) when the DPF temperature T is higher than the target temperature Tt. If the DPF temperature T is lower than the target temperature Tt, the duty ratio DR is increased from the ratio $DR_A$ to other ratio $DR_C$ (for instance, 65%) or other ratio $DR_D$ (for instance, 100%). Instead of switching the duty ratio DR by setting the duty ratio DR to the four levels (the ratios $DR_A$, $DR_B$, $DR_C$, $DR_D$) on the basis of the ratio $DR_A$ in accordance with the DPF temperature T, the duty ratio DR may be changed continuously in accordance with the DPF temperature T. In the case where the DPF temperature T becomes so high that the degradation of the oxidation catalyst or the damage to the DPF 3 may be caused, the safety can be improved by stopping the temperature increasing operation by setting the duty ratio DR to 0% until the DPF temperature T decreases to the predetermined value or lower. When the DPF temperature T is lower than activation temperature of the oxidation catalyst (for instance, 200° C.), no or little temperature increasing effect is exerted even if the quantity of the hydrocarbon in the exhaust gas is increased. Therefore, in such a case, the duty ratio DR is set to 0% to stop the temperature increasing operation. Thus, the effect of inhibiting the fuel consumption deterioration can be improved.

Figure 5:
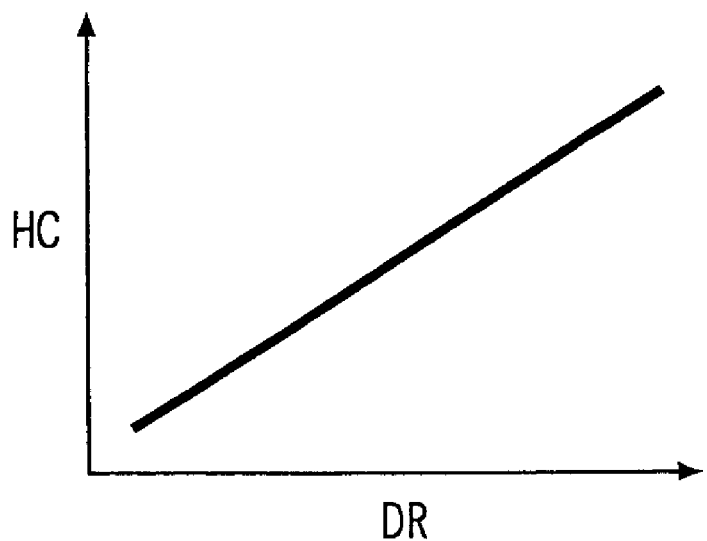
FIG. 5 is a graph showing a relationship between the duty ratio of the temperature increasing operation and a quantity of hydrocarbon included in the exhaust gas according to the first embodiment.
Figure 6:
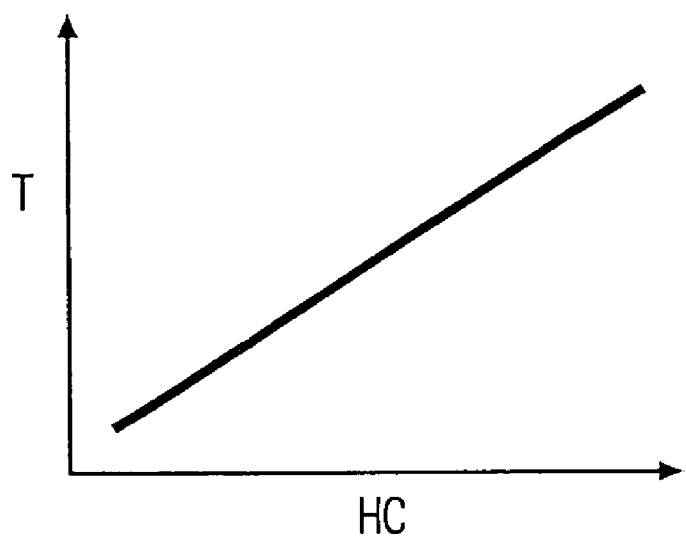
FIG. 6 is a graph showing a relationship between the quantity of the hydrocarbon included in the exhaust gas and the DPF temperature according to the first embodiment.

As shown in FIG. 5, the quantity HC of the hydrocarbon discharged form the engine 1 is increased as the duty ratio DR is increased in the temperature increasing operation. As the quantity HC of the hydrocarbon discharged form the engine 1 increases, the DPF temperature T increases because of the reaction heat of the hydrocarbon as shown in FIG. 6. Therefore, the quantity HC of the hydrocarbon-flowing into the DOC 4 can be controlled continuously or stepwise by changing the duty ratio DR in accordance with the DPF temperature T. Thus, the hydrocarbon of the optimum quantity for increasing the DPF temperature T to the target temperature Tt or for maintaining the DPF temperature T near the target temperature Tt can be supplied in accordance with the DPF temperature T at that time. As a result, the DPF temperature T can be controlled optimally.

Figure 7:
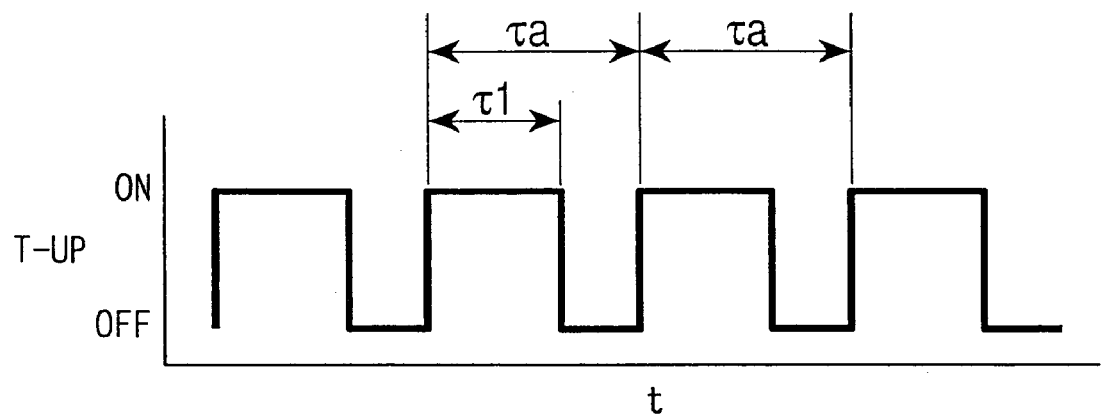
FIG. 7 is a time chart showing a method of switching temperature increasing means between an operated state and an interrupted state based on the duty ratio according to the first embodiment.
Figure 8:
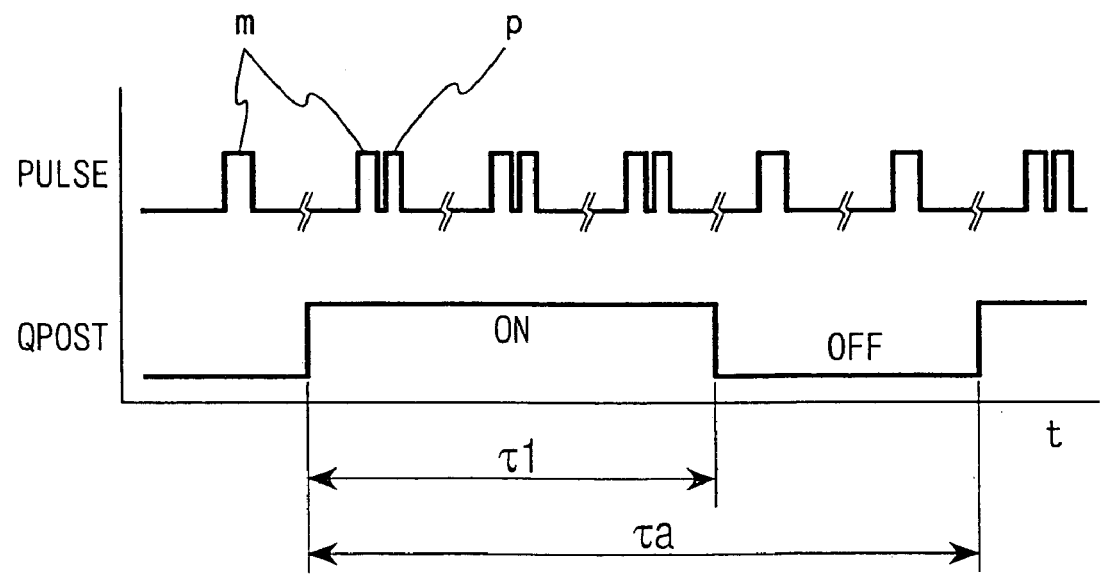
FIG. 8 is a time chart showing a method of switching between performance and interruption of post-injection based on the duty ratio according to the first embodiment.

The duty ratio DR is changed by changing a period $\tau 1$ for performing the temperature increasing operation in a predetermined repeating cycle period $\tau a$ (for instance, 3 seconds) as shown in FIG. 7. The period $\tau 1$ is equal to or shorter than the repeating cycle period $\tau a$. A state "ON" in a solid line "IT-UP" in FIG. 7 represents a state in which the temperature increasing operation is performed, and a state "OFF" in the solid line T-UP represents a state in which the temperature increasing operation is interrupted. In this case, the duty ratio DR is calculated by dividing the period $\tau 1$ by the repeating cycle period $\tau a$. In the case where the temperature increasing means performs the post-injection, a ratio between a cycle for performing the post-injection and another cycle not for performing the post-injection is changed as shown in FIG. 8. On a solid line "PULSE" shown in FIG. 8, projections "m" represent main injection pulses for performing main injection and projections "p" represent post-injection pulses for performing the post-injection. In a solid line "QPOST" in FIG. 8, the post-injection is performed in a period "ON" and is interrupted in a period "OFF". The periods $\tau 1$, $\tau a$ may be synchronized with a crank angle.

The temperature increasing means is configured so that the DPF temperature T becomes a predetermined value higher than the target temperature Tt in each operating condition when the temperature increasing operation is performed at the duty ratio DR of 100%. In the case where the temperature increasing means performs the post-injection, the ECU 6 stores the post-injection quantities for increasing the DPF temperature T to the predetermined value (for instance, 750° C.) when the post-injection is performed at each rotation speed and each accelerator position for a sufficient period, for instance. The ECU 6 stores the post-injection quantities in the form of a two-dimensional map based on the rotation speed and the accelerator position, for instance.

As a technology based on a similar concept, there is a method of increasing or decreasing the post-injection quantity in one injection based on the sensed exhaust gas temperature. In this method, the quantity of the hydrocarbon included in the exhaust gas is increased by increasing the post-injection quantity when the exhaust gas temperature is low, and is decreased by decreasing the post-injection quantity when the exhaust gas temperature is high. Generally, in the case of performing the post-injection, many verification items and adjustment items are added in order to correct the change in the engine output or to prevent the deterioration in the emission due to an increase of the post-injection quantity. The engine output changes when the post-injection is performed because part of the post-injection fuel is combusted in the cylinder. Therefore, a main injection quantity has to be corrected so that the engine output in the case where the post-injection is performed coincides with the engine output in the case where the post-injection is not performed. Moreover, if the post-injection fuel is injected at too late timing after a piston passes a top dead center, there is a possibility of a problem that the post-injection fuel reaches a cylinder wall and causes oil dilution. To the contrary, if the post-injection timing is too early, the interval between the main injection and the post-injection becomes too narrow. As a result, smoke will be generated easily, or the sufficient hydrocarbon cannot be discharged because the post-injection fuel is combusted in the cylinder.

Therefore, in the case where the post-injection quantity is changed gradually in accordance with the exhaust gas temperature, very many verifications and adjustments are required additionally, so the range for increasing or decreasing the post-injection quantity is limited to a narrow range in a practical use. As a result, there is a possibility that the original object to change the temperature of the DPF 3 continuously cannot be achieved sufficiently.

Figure 9:
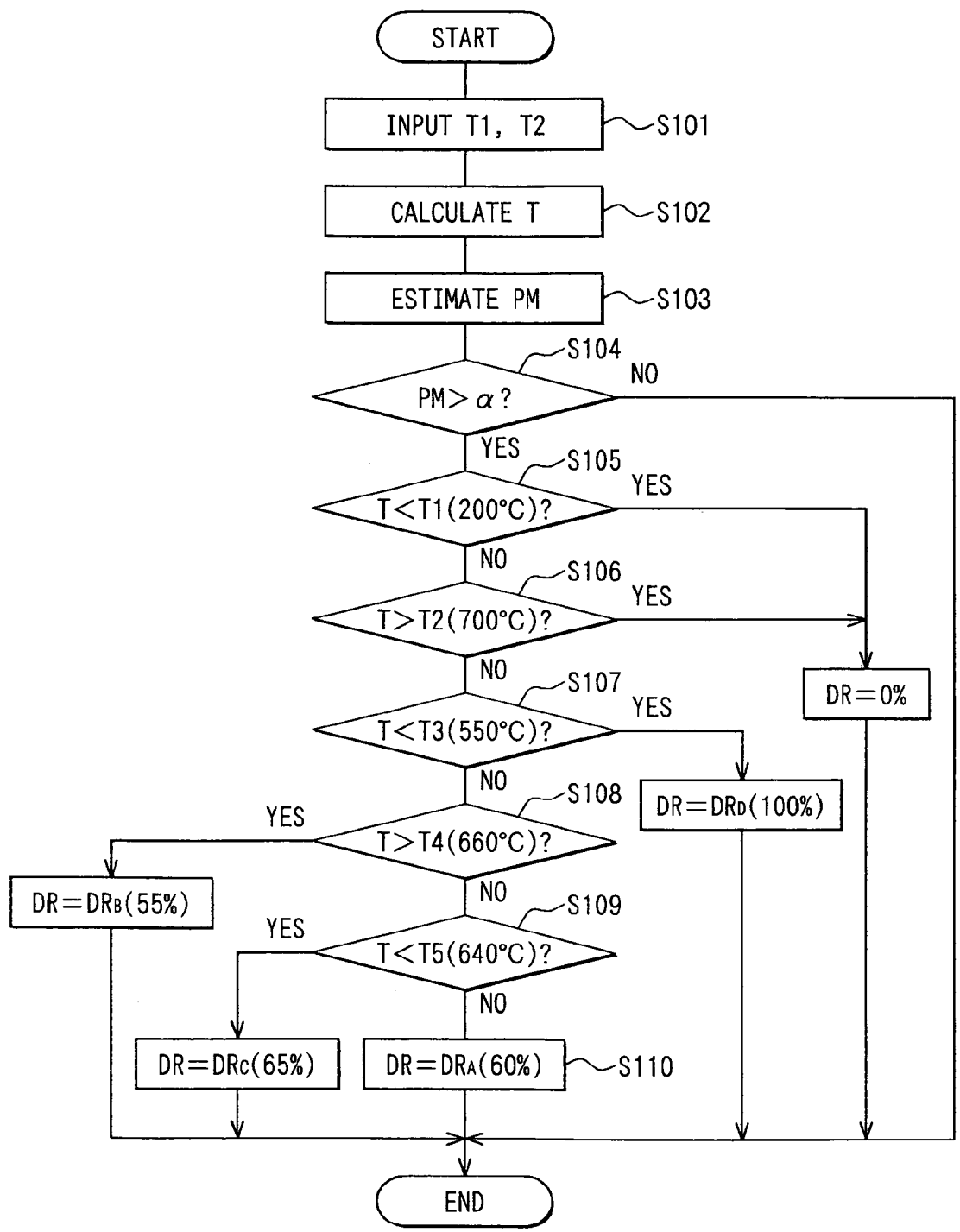
FIG. 9 is a flowchart showing regeneration control performed by an ECU according to the first embodiment.

Next, the regeneration control performed by the ECU 6 of the present embodiment will be explained based on a flowchart shown in FIG. 9. First, in Step S101, the ECU 6 receives the exhaust gas temperatures T1, T2 from the exhaust gas temperature sensors 51, 52 disposed upstream and downstream of the DPF 3. Then, in. Step S102, the DPF temperature T is calculated based on the exhaust gas temperatures T1, T2. One of the exhaust gas temperatures T1, T2 may be simply employed as the DPF temperature T. Alternatively, the DPF temperature T may be calculated from the exhaust gas temperatures T1, T2. In Step S103, the particulate matter accumulation quantity PM of the DPF 3 is estimated. For instance, the particulate matter accumulation quantity PM can be estimated based on the pressure difference ΔP across the DPF 3 sensed by the pressure difference sensor 8 and the exhaust gas flow rate QE calculated from the output of the air flow meter 53 by using the relationship (shown in FIG. 3) between the pressure difference ΔP across the DPF 3 and the particulate matter accumulation quantity PM with respect to the flow rate QE of the passing exhaust gas.

In Step S104, it is determined whether the estimated particulate matter accumulation quantity PM reaches a predetermined value α at which the regeneration of the DPF 3 is necessary. If the particulate matter accumulation quantity PM is greater than the predetermined value α, the temperature increasing operation of the DPF 3 is performed in order to regenerate the DPF 3. As the temperature increasing operation, the post-injection is performed, for instance. More specifically, a small amount of the fuel is injected additionally after the main fuel injection, which is performed to operate the engine 1, in the expansion stroke after the top dead center so that the unburned hydrocarbon is generated. The hydrocarbon generates heat in the oxidation reaction on the DOC 4 and supplies the high-temperature exhaust gas to the DPF 3. If the result of the determination in Step S104 is "NO", the post-injection is not performed and the processing is ended directly.

In Step S105, it is determined whether the DPF temperature T is lower than a predetermined value T1 (for instance, 200° C.). The predetermined value T1 is activation temperature of the oxidation catalyst. If the result of the determination in Step S105 is "YES", or if the DPF temperature T is lower than the predetermined temperature T1 (200° C., for instance), the oxidation catalyst is not activated, so the temperature increasing effect is not achieved even if the hydrocarbon is supplied to the DOC 4. Therefore, the post-injection is stopped by setting the duty ratio to 0%. If the result of the determination in Step S105 is "NO", it is determined whether the DPF temperature T is higher than a predetermined value T2 (for instance, 700° C.) in Step S106. If the DPF temperature T is higher than the predetermined value T2 (for instance, 700° C.), there is a possibility of the degradation of the oxidation catalyst or the damage to the DPF 3. Therefore, the duty ratio DR is set to 0% and the post-injection is stopped.

If the result of the determination in Step S106 is "NO", the processing proceeds to Step S107, and it is determined whether the DPF temperature T is lower than a predetermined value T3 (for instance, 550° C.). If the DPF temperature T is lower than the-predetermined value T3 (for instance, 550° C.), the DPF temperature T is much lower than the target temperature Tt (for instance, 650° C.). Therefore, the duty ratio DR is set to a value $DR_D$ (for instance, 100%) in order to increase the DPF temperature T quickly. If the result of the determination in Step S107 is "NO", the processing proceeds to Step S108 and it is determined whether the DPF temperature T is higher than a predetermined value T4 (for instance, 660° C.). If the DPF temperature T is higher than the predetermined value T4 (for instance, 660° C.), the DPF temperature T is slightly higher than the target temperature Tt (for instance, 650° C.). Therefore, the duty ratio DR is set to a ratio $DR_B$ (for instance, 55%) to decrease the DPF temperature T. The ratio $DR_B$ is set to a certain value (for instance, 55%) providing the DPF temperature T lower than the target temperature Tt as shown in FIG. 4.

If the result of the determination in Step S108 is "NO", the processing proceeds to Step S109 and it is determined whether the DPF temperature T is lower than a predetermined value T5 (for instance, 640° C.). If the DPF temperature T is lower than the predetermined value T5 (for instance, 640° C.), the DPF temperature T is slightly lower than the target temperature Tt (for instance, 650° C.). Therefore, the duty ratio DR is set to a ratio $DR_C$ (for instance, 65%) in order to increase the DPF temperature T. The ratio $DR_C$ is set to a certain value (for instance, 65%) providing the DPF temperature T higher than the target temperature Tt as shown in FIG. 4.

If the result of the determination in Step S109 is "NO", or if the DPF temperature T is higher than the predetermined value T5 (for instance, 640° C.) and is lower than the predetermined value T4 (for instance, 660° C.), the processing proceeds to Step S110 and the duty ratio DR is set to a ratio $DR_A$ (for instance, 60%). The duty ratio $DR_A$ is set to a certain value (for instance, 60%) providing the DPF temperature T equal to the target temperature Tt as shown in FIG. 4. The predetermined value T3 (for instance, 550° C.) is higher than the predetermined value T1 (for instance, 200° C.). The predetermined value T5 (for instance, 640° C.) is higher than the predetermined value T3 (for instance, 550°

C.). The predetermined value T4 (for instance, 660° C.) is higher than the predetermined value T5 (for instance, 640° C.).

Figure 10:
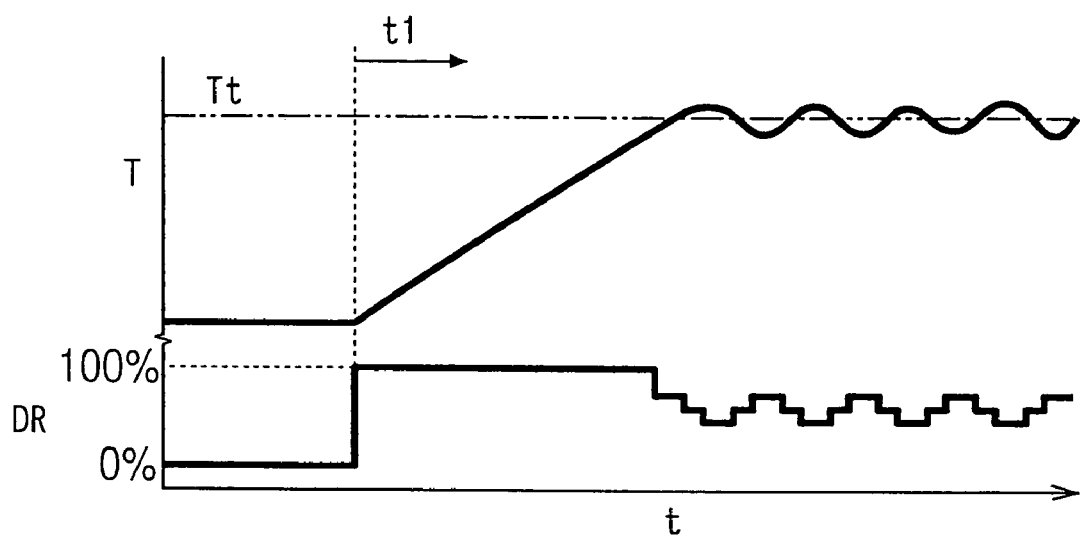
FIG. 10 is a time chart showing an effect of changing the duty ratio in the temperature increasing operation in accordance with the DPF temperature according to the first embodiment.
Figure 11:
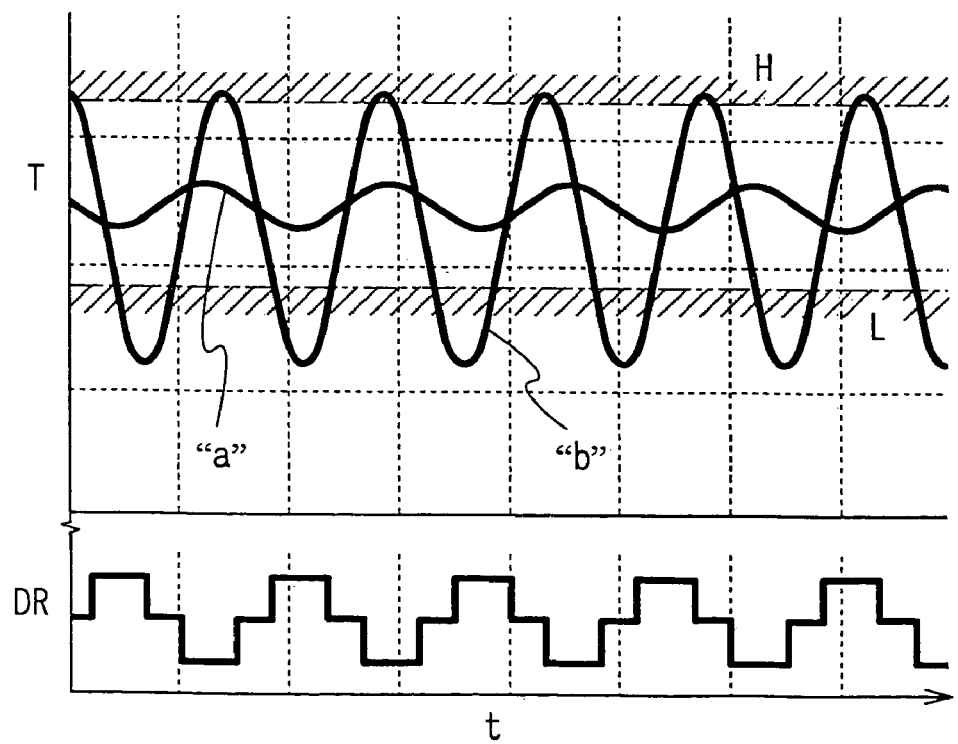
FIG. 11 is a time chart showing an effect of a temperature controlling method according to the first embodiment.

An effect of the present embodiment is shown in a time chart of FIG. 10. The time chart shown in FIG. 10 is an example of the regeneration control performed by the ECU 6 based on the flowchart shown in FIG. 9. As shown in FIG. 10, the DPF temperature T is low at the start of the regeneration control. At that time, it is determined that the effect of the temperature increasing operation is low, so the duty ratio. DR is set to 0%. When the DPF temperature T becomes equal to or higher than the activation temperature of the oxidation catalyst at a time point t1, the duty ratio DR is set to 100% and the DPF temperature T is increased quickly. If the DPF temperature T approaches the target temperature Tt, the duty ratio DR is decreased stepwise so that the DPF temperature T increases gradually. If the DPF temperature T becomes lower than the target temperature Tt because of the decrease of the duty ratio DR, the duty ratio DR is increased stepwise to increase the DPF temperature T gradually. Through the repetition of these operations, the DPF temperature T can be maintained near the target temperature Tt as shown by a solid line "a" in FIG. 11. Compared to the case of the conventional temperature controlling method shown by a solid line "b" in FIG. 11, the method of the present embodiment has excellent controllability of the DPF temperature T as shown by the solid line "a" in FIG. 11 and the possibility of the degradation of the DOC 4 or the damage to the DPF 3 is reduced largely. Thus, the deterioration in the fuel consumption, which is caused when the particulate matters cannot combusted, can be prevented. As a result, the regeneration control of the DPF 3 can be performed efficiently.

Second Embodiment

Figure 12:
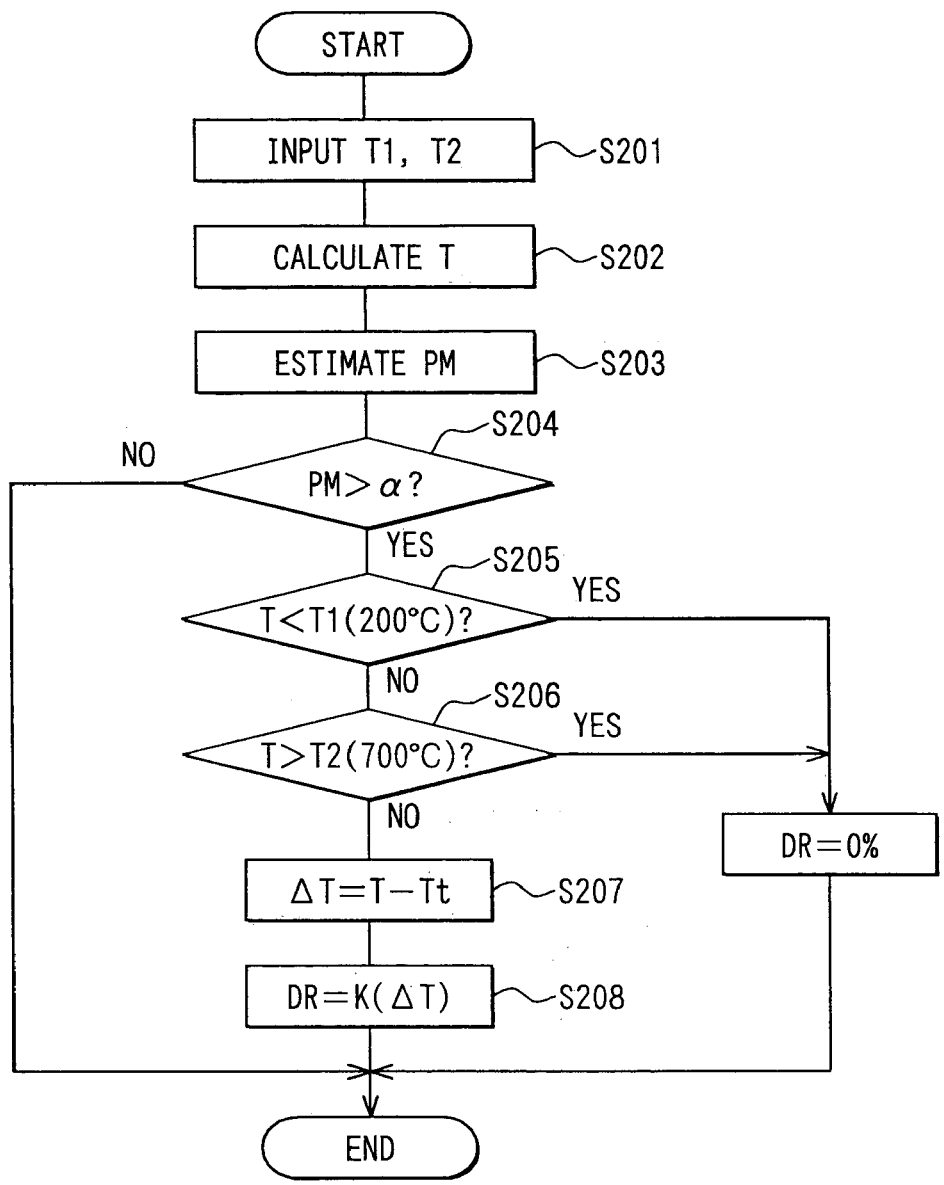
FIG. 12 is a flowchart showing regeneration control performed by an ECU according to a second embodiment of the present invention.
Figure 13:
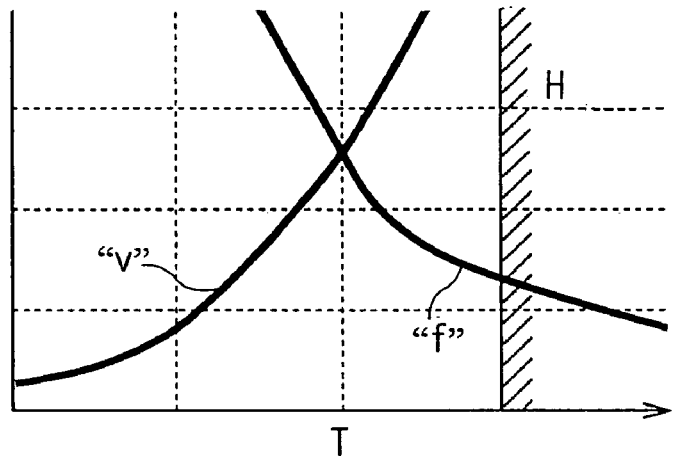
FIG. 13 is a graph showing a relationship between combustion velocity of particulate matters and a deterioration degree in fuel consumption with respect to DPF temperature of the related art.
Figure 14A:
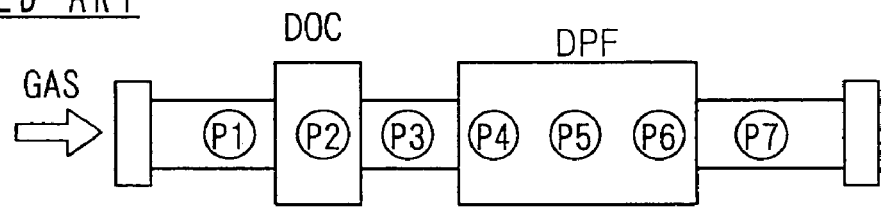
FIG. 14A is a schematic diagram showing an exhaust pipe of the related art.
Figure 14B:
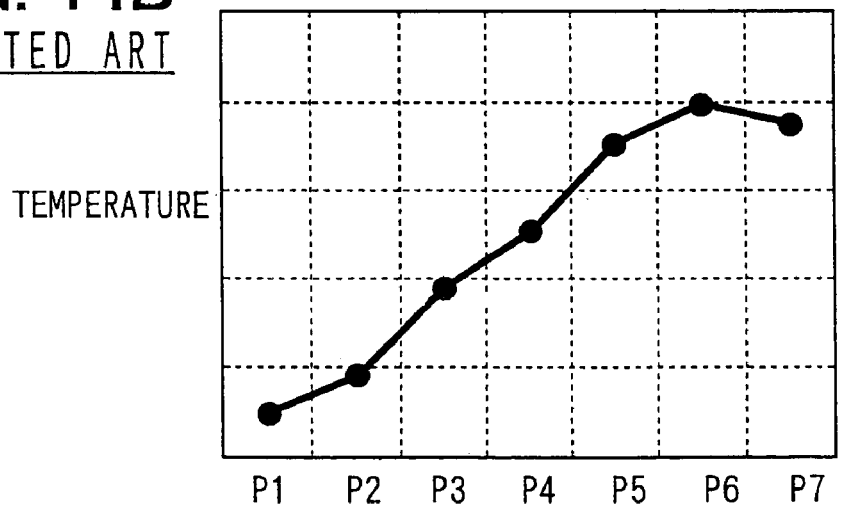
FIG. 14B is a graph showing temperature distribution in the exhaust pipe of FIG. 14A in the case where temperature of a DOC decreases rapidly.
Figure 15:
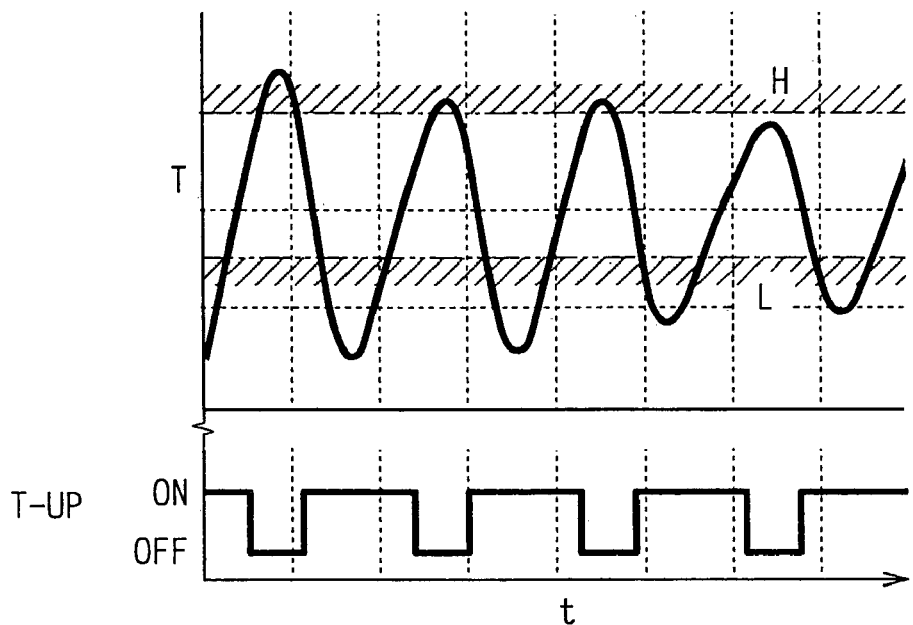
FIG. 15 is a time chart showing a temperature controlling method of the related art.
Figure 16:
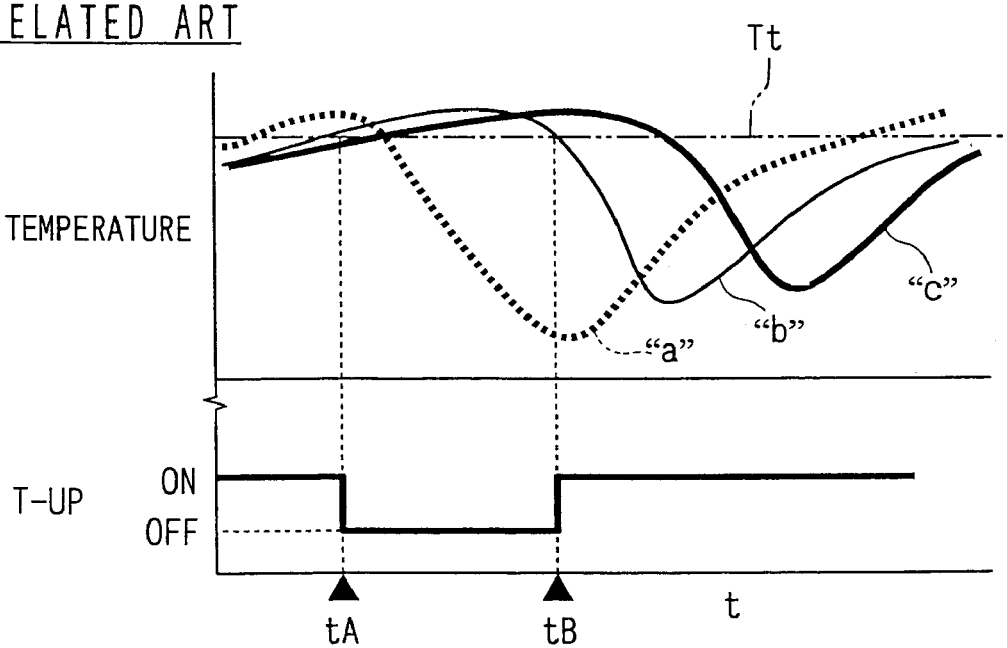
FIG. 16 is a time chart showing a transition of the DPF temperature at the time when temperature increasing means is stopped in the related art.

Next, regeneration control performed by an ECU 6 according to a second embodiment of the present invention will be explained based on FIG. 12. In the second embodiment, the duty ratio DR is changed continuously in accordance with the DPF temperature T. First, in Step S201, the ECU 6 receives the exhaust gas temperatures T1, T2 from the exhaust gas temperature sensors 51, 52, which are disposed upstream and downstream of the DPF 3 respectively. In Step S202, the DPF temperature T is calculated based on the exhaust gas temperatures. T1, T2. The temperature T1 or the temperature T2 may be simply employed as the DPF temperature T. Alternatively, the DPF temperature T may be calculated from the temperatures T1, T2. In Step S203, the particulate matter accumulation quantity PM of the DPF 3 is estimated. For instance, the particulate matter accumulation quantity PM is estimated from the pressure difference $\Delta P$ across the DPF 3 sensed by the pressure difference sensor 8 and the exhaust gas flow rate QE calculated from the output of the air flow mater 53 based on the relationship (shown in FIG. 3) between the pressure difference $\Delta P$ across the DPF 3 and the particulate matter accumulation quantity PM with respect to the flow rate QE of the passing exhaust gas.

In Step S204, it is determined whether the estimated particulate matter accumulation quantity PM reaches a predetermined value $\alpha$, at which the regeneration of the DPF 3 is necessary. If the particulate matter accumulation quantity PM is greater than the predetermined value $\alpha$, the temperature increasing operation of the DPF 3 is performed in order to regenerate the DPF 3. The post-injection is performed as the temperature increasing operation, for instance. More specifically, a small amount of the fuel is injected additionally after the main fuel injection, which is performed to operate the engine, in the expansion stroke after the top dead center to generate the unburned hydrocarbon. The hydrocarbon generates the heat through the oxidation reaction on the DOC 4. Thus, the high-temperature exhaust gas is provided to the DPF 3. If the result of the determination in Step S204 is "NO", the post-injection is not performed and the processing is ended directly.

In Step S205, it is determined whether the DPF temperature T is lower than a predetermined value T1 (for instance, 200° C.). The predetermined value T1 is the activation temperature of the oxidation catalyst. If the DPF temperature T is lower than the predetermined value T1 (for instance, 200° C.), it is determined that the oxidation catalyst is not activated, so the temperature increasing effect cannot be achieved even if the hydrocarbon is supplied to the DOC 4. Therefore, the post-injection is stopped by setting the duty ratio DR to 0%. If the result of the determination in Step S205 is "NO", it is determined whether the DPF temperature T is higher than a predetermined value T2 (for instance, 700° C.) in Step S206. If the DPF temperature T is higher than the predetermined value T2 (for instance, 700° C.), there is a possibility of the degradation of the oxidation catalyst or the damage to the DPF 3. Therefore, the post-injection is stopped by setting the duty ratio DR to 0%. The predetermined value T2 is greater than the predetermined value T1.

If the result of the determination in Step S206 is "NO", the processing proceeds to Step S207 and a deviation $\Delta T$ of the present DPF temperature T from the target temperature Tt (for instance, 650° C.) is calculated. Then, in Step S208, the duty ratio DR is calculated from the deviation $\Delta T$ by using a function $K(\Delta T)$ expressed by a following expression (1).

$$K(\Delta T) = -Kp \times \Delta T + A0, \tag{1}$$

In the expression (1), Kp represents a predetermined positive coefficient and A0 is a certain constant for providing a duty ratio (for instance, 60%), at which the DPF temperature T coincides with the target temperature Tt, when the deviation $\Delta T$ is zero.

Also in this control of the second embodiment, the similar effects of quickly increasing the DPF temperature T to the target temperature Tt and of maintaining the DPF temperature T near the target temperature Tt in the regenerating operation can be achieved.

The present invention should not be limited to the disclosed embodiments, but may be implemented in many other ways without departing from the spirit of the invention.

What is claimed is:

1. An exhaust gas cleaning system of an internal combustion engine, the exhaust gas cleaning system comprising:
   a particulate filter disposed in an exhaust passage of the internal combustion engine;
   temperature increasing means for increasing temperature of the particulate filter;
   temperature estimating means for estimating the temperature of the particulate filter;
   particulate matter accumulation quantity estimating means for estimating a quantity of particulate matters accumulated in the particulate filter; and
   regenerating means for regenerating the particulate filter by increasing the temperature of the particulate filter to a predetermined value through an operation of the temperature increasing means and by eliminating the particulate matters accumulated in the particulate filter through combustion when the quantity of the particulate matters accumulated in the particulate filter, which is estimated by the particulate matter accumulation quantity estimating means, exceeds a predetermined value, wherein the regenerating means includes energy input amount determining means for determining an amount of energy inputted by the temperature increasing means in accordance with the temperature of the particulate filter estimate by the temperature estimating means; and wherein the energy input amount determining means includes duty ratio determining means for determining a duty ratio between a performing period and an interrupting period of the temperature increasing operation performed by the temperature increasing means in accordance with the temperature of the particulate filter estimated by the temperature estimating means.

2. The exhaust gas cleaning system of the internal combustion engine as in claim 1, wherein the duty ratio determining means determines a ratio of a period for performing the temperature increasing operation in a predetermined cycle period with respect to the predetermined cycle period for every predetermined cycles in accordance with the temperature of the particulate filter.

3. The exhaust gas cleaning system of the internal combustion engine as in claim 2, wherein the particulate filter is a ceramic filter, which has an oxidation catalyst on its upstream side or supports the oxidation catalyst thereon.

4. The exhaust gas cleaning system of the internal combustion engine as in claim 3, wherein the temperature increasing means increases a quantity of hydrocarbon included in the exhaust gas and increases the temperature of the particulate filter by using reaction heat generated from the hydrocarbon on the oxidation catalyst.

5. The exhaust gas cleaning system of the internal combustion engine as in claim 4, wherein the temperature increasing means increases the quantity of the hydrocarbon included in the exhaust gas by performing at least one of post-injection, retardation of fuel injection timing, restriction of an intake air flow rate and an increasing operation of an exhaust gas recirculation quantity of the exhaust gas recirculated into the intake air.

6. The exhaust gas cleaning system of the internal combustion engine as in claim 3, wherein the duty ratio determining means sets the duty ratio to a standard value if an output of the temperature estimating means is within a predetermined range with respect to target temperature, the duty ratio determining means decreases the duty ratio with respect to the standard value if the output of the temperature estimating means is higher than the target temperature by at least a predetermined value, the duty ratio determining means increases the duty ratio with respect to the standard value if the output of the temperature estimating means is lower than the target temperature by at least a predetermined value, the duty ratio determining means stops the operation of the temperature increasing means by setting the duty ratio to zero if the output of the temperature estimating means is high enough to cause damage to the particulate filter or degradation of the oxidation catalyst, and the duty ratio determining means stops the operation of the temperature increasing means by setting the duty ratio to zero if the output of the temperature estimating means is lower than activation temperature of the oxidation catalyst.

7. The exhaust gas cleaning system of the internal combustion engine as in claim 1, wherein the temperature estimating means estimates the temperature of the particulate filter based on an output of a temperature sensor disposed upstream or downstream of the particulate filter or based on outputs of temperature sensors disposed upstream and downstream of the particulate filter.

8. The exhaust gas cleaning system of the internal combustion engine as in claim 1, wherein the particulate matter accumulation quantity estimating means estimates the quantity of the particulate matters accumulated in the particulate filter based on at least one of a pressure difference across the particulate filter and an operating state of the internal combustion engine.

9. A method for operating an exhaust gas cleaning system for an internal combustion engine, the exhaust gas cleaning system comprising a particulate filter disposed in an exhaust passage of the internal combustion engine, said method comprising:

estimating the temperature of the particulate filter;

estimating the quantity of particulate matter accumulated in the particulate filter;

regenerating the particulate filter by increasing its temperature to a predetermined value so as to eliminate accumulated particulate matter through combustion when an estimated quantity of accumulated particulate matter exceeds a predetermined value, determining an amount of energy inputted to the filter by an estimate of its increased temperature during such combustion, determining a duty ratio between a performing period and an interrupting period of the time temperature is increased in accordance with the estimated temperature of the particulate filter.

10. A method as in claim 9 wherein the determined duty ratio is determined as a ratio of a period for performing the temperature increasing operation in a predetermined cycle period with respect to the predetermined cycle period for every predetermined cycle in accordance with the temperature of the particulate filter.

11. A method as in claim 10 wherein the particulate filter is a ceramic filter, which has an oxidation catalyst on its upstream side or supports the oxidation catalyst thereon.

12. A method as in claim 11 wherein the temperature increasing step increases a quantity of hydrocarbon included in the exhaust gas and increases the temperature of the particulate filter by using reaction heat generated from the hydrocarbon on the oxidation catalyst.

13. A method as in claim 12 wherein the temperature increasing step increases the quantity of the hydrocarbon included in the exhaust gas by performing at least one of post-injection, retardation of fuel injection timing, restriction of an intake air flow rate and an increasing operation of an exhaust gas recirculation quantity of the exhaust gas recirculated into the intake air.

14. A method as in claim 11 wherein
the duty ratio determining step sets the duty ratio to a standard value if an output of the temperature estimating means is within a predetermined range with respect to target temperature,
the duty ratio determining step decreases the duty ratio with respect to the standard value if the output of the temperature estimating means is higher than the target temperature by at least a predetermined value,
the duty ratio determining step increases the duty ratio with respect to the standard value if the output of the temperature estimating means is lower than the target temperature by at least a predetermined value,
the duty ratio determining step stops the operation of the temperature increasing means by setting the duty ratio to zero if the output of the temperature estimating means is high enough to cause damage to the particulate filter or degradation of the oxidation catalyst, and
the duty ratio determining step stops the operation of the temperature increasing means by setting the duty ratio to zero if the output of the temperature estimating means is lower than activation temperature of the oxidation catalyst.

15. A method as in claim 9 wherein
the temperature estimating step estimates the temperature of the particulate filter based on an output of a temperature sensor disposed upstream or downstream of the particulate filter or based on outputs of temperature sensors disposed upstream and downstream of the particulate filter.

16. A method as in claim 9 wherein
the estimating of accumulated particulate matter estimates the quantity of the particulate matter accumulated in the particulate filter based on at least one of a pressure difference across the particulate filter and an operating state of the internal combustion engine.

* * * * *